JAMES M. ALBERTSON, OF NEW LONDON, CONNECTICUT.

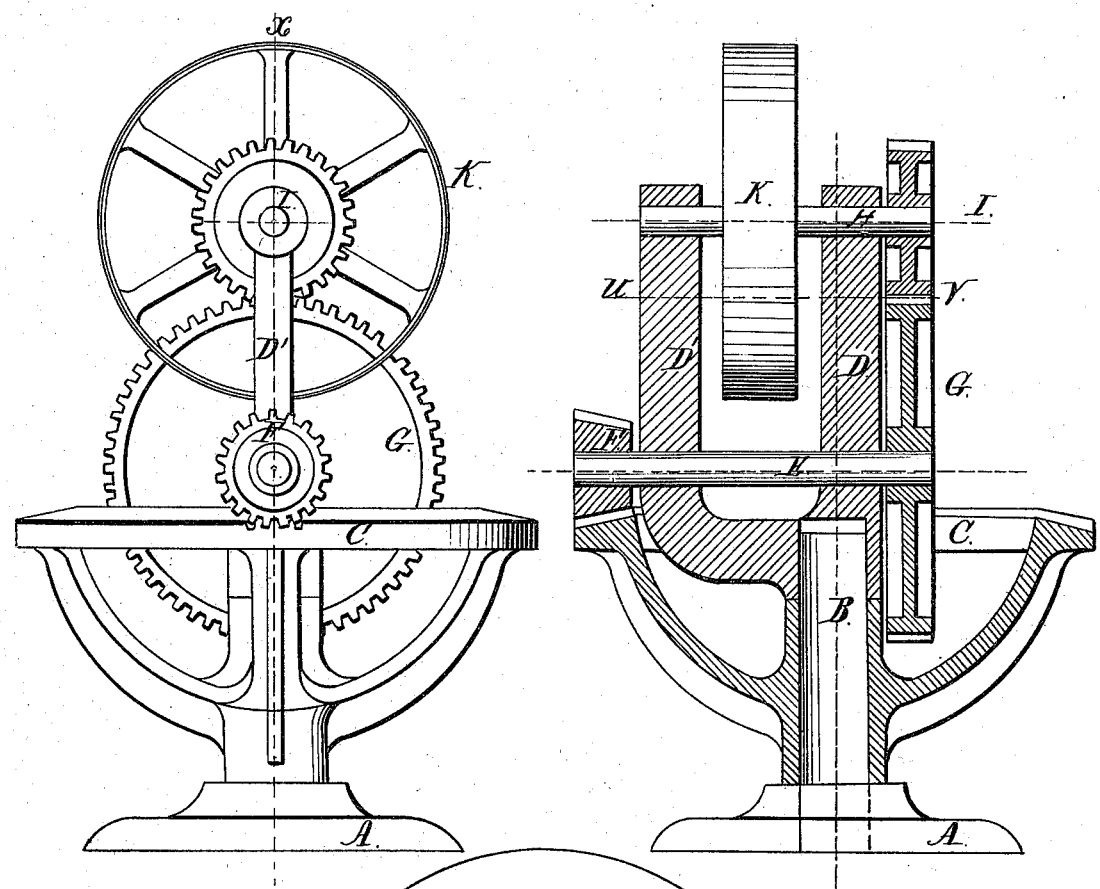

Letters Patent No. 89,825, dated May 4, 1869.

---

IMPROVEMENT IN HORSE-POWERS.

---

The Schedule referred to in these Letters Patent and making part of the same.

---

*To all whom it may concern:*

Be it known that I, JAMES M. ALBERTSON, of New London, in the county of New London, and State of Connecticut, have invented a new and useful Improvement in a Horse-Power Machine, of which the following is a full and exact description, which will enable those skilled in the art to use and manufacture the same.

In all horse-power machines which have come to the knowledge of the inventor, the great difficulty has been to produce a machine from which a belt can be taken directly to the machinery it is to drive, without interfering with the revolving arm to which the horse is attached. The chief object of my invention is to remove this difficulty.

In the drawings attached, which form a part of this specification, and in which like letters refer to like parts, A is a base, or stand which supports the vertical shaft B. On this shaft rotates the main gear-wheel C, which is constructed with bent arms, forming a concave space within the rim of the wheel. On the top of the shaft, above the hub of this wheel, is attached the frame D D″, which is keyed, or bolted firmly to it, or so fastened that it cannot revolve.

This frame has an arm, D′, which extends out nearly to the rim of the main wheel, and contains one of the bearings which supports the shaft E, on the outer end of which is the pinion F, geared into the main wheel C.

The other bearing is in the arm D, and on this end of the shaft is hung the wheel G, which, owing to the form of the wheel C, revolves within its circumference, thus avoiding the levers to which the animal which operates the machine is attached.

Above this another shaft H, with suitable gearing, may be placed, for the purpose of increasing the speed and supporting the band-wheel K.

The advantages of the above-described arrangement, are—

First, the horse or other animal can travel round without interruption, or interference with the machine.

Second, all long shafts extending beyond the path of the horse, for the purpose of conveying the motion, are avoided.

I do not claim the accomplishment of the advantages of this arrangement, but only the mode of accomplishing them set forth in this specification; I do not claim the curving, or bending of the arms of the wheels as new.

What I claim as my invention, and desire to secure by Letters Patent, is—

1. The arrangement of the gear-wheel C, pinion F, shaft E, and wheel G, to allow the revolution of the wheel G within the wheel C, and to bring the shaft E at such height as to engage the pinion F.

2. In combination with above arrangement, the frame D D′, consisting of two arms provided with journals for the shaft E, the whole attached to the upper end of shaft B, substantially as herein described.

J. M. ALBERTSON.

Witnesses:
   H. J. CROCKER,
   N. G. RICHARDS.